April 7, 1953 A. V. BEDFORD 2,634,324

COLOR TELEVISION

Filed Dec. 1, 1948 3 Sheets-Sheet 1

INVENTOR
Alda V. Bedford
BY
[signature]
ATTORNEY

INVENTOR
Alda V. Bedford
BY
Olin Q. Mitchell
ATTORNEY

April 7, 1953 A. V. BEDFORD 2,634,324

COLOR TELEVISION

Filed Dec. 1, 1948 3 Sheets-Sheet 3

INVENTOR
Alda V. Bedford
BY
ATTORNEY

Patented Apr. 7, 1953 2,634,324

UNITED STATES PATENT OFFICE 2,634,324

COLOR TELEVISION

Alda V. Bedford, Princeton, N. J., assignor to Radio Corporation of America, a corporation of Delaware Application December 1, 1948, Serial No. 62,864

16 Claims. (Cl. 178—5.2)

This invention relates to multicolor television systems and methods and it is particularly directed to arrangements wherein the band width or frequency spectrum required to transmit image intelligence is reduced considerably without impairment of either picture quality or resolution of the image observed at receiving points.

Multicolor television systems have become basically separated into two channel categories, each of which requires a substantially like band width. One of these systems is the so-called sequential mutlicolor system whereby an optical image at the transmitter is scanned in sequentially repeating fields of progressively component or primary colors. Each of the selected colors into which the image field is analyzed is chosen as one of the component or primary colors which additively combined would produce white light. The component colors usually selected are red, green, and blue.

In another form of color television it has been proposed to transmit color representations of the subject in all of its color components simultaneously. This is done by providing separate camera tubes or separate color analyzers which under scanniing operations bring about the production of separate signal trains each representing the image in one of the selected component colors such as one of red, one of green, and one of blue.

For equal detail and definition such systems and methods would normally require a frequency spectrum for transmission approximately three times that required for an ordinary black and white or monochrome transmission. This will be more readily appreciated when it is understood that signals representing the image in each of the three component colors are transmitted simultaneously through separate and independent signal channels, each of the signal channels normally required to pass signals having a band width of the same order as the black and white image signal transmission. Standards have now been accepted and established in industry allowing approximately 4.5 megacycles video-frequency band width for transmitting black and white images. Accordingly, the transmission of images in color by such an arrangement might therefore be expected to occupy a total band of 13.5 megacycles or more.

Various proposals have been made whereby in simultaneous type color television operations it is possible to reduce the band width for such transmissions. Among these proposals is that generally set forth by Alfred C. Schroeder in his U. S. patent application, Serial No. 706,613, filed October 30, 1946, now Patent No. 2,535,552, granted December 26, 1950, and entitled "Color Television Apparatus." In the Schroeder arrangement provision has been made for saving a portion of the frequency spectrum and to accomplish this result, recourse has been taken to the fact that the resolution of the human eye for detail is generally considered as being least in the blue end of the visible spectrum and greatest at the green portion of the visible spectrum. Consequently, by transmitting image signals of which the band width allotted for the different component colors are varied in accordance with the color being represented, it has been possible to reduce the frequency spectrum required for satisfactory color television transmission.

In accordance with my copending U. S. application entitled "Simultaneous Multicolor Television," Serial No. 714,750, filed December 7, 1946, now Patent No. 2,554,693, granted May 29, 1951, there is shown and described an arrangement and method for the transmission of color television signals wherein the transmission of the low frequency portion of each of the three tricolor signals in three separate channels is accomplished simultaneously and also there is transmitted concurrently therewith a signal which represents the high frequency portion determined by the sum of the three separate tricolor signals into which the image is analyzed. A signal of this character has been termed a mixed high frequency signal and it may be combined for purposes of transmission with any of the low frequency portions of the separate tricolor signals.

In the receiving end of the television system a signal of this character, the signal representing the mixture of high frequency components, is isolated from the low frequency component by means of filters and then subsequentially added to each of the selected three low frequency signals to produce three completely new tricolor signals. These separate new signals may then be applied respectively to the three color reproducers or kinescopes such as those illustrated by way of example in an article entitled "An experimental simultaneous color television system" beginning on page 861 of the Proceedings of the Institute of Radio Engineers for September, 1947.

In the system of mixed highs shown and described in my copending application supra, the mixed highs originating in any and all channels are supplied to all three kinescopes. The amount of high-frequency light modulation produced by each kinescope will vary not only upon the amount of signal change but also upon the low-frequency signal at that time applied to the particular kinescope. This becomes apparent when it is appreciated that light output of the kinescope is not a linear function of the input voltage.

According to the present invention this irregularity is compensated for at the transmitter by applying the mixed highs and the individual lows to three circuits each having an amplitude gain characteristic complementary to that of the kinescopes. The mixed highs derived from the compensated signals are then added to one channel and the three signals are transmitted.

A primary object of this invention is to provide for improved color television signal transmission.

Another object of this invention is to provide for color image transmission in a minimum of signal band width.

Still another object of this invention is to provide for improved color image transmission in reduced band width.

Other and incidental objects of this invention will be apparent to those skilled in the art from a reading of the following specification and an inspection of the accompanying drawing in which.

The kinescope employed in television receivers generally has a very non-linear characteristic with a very gradual cut-off. A grid control characteristic of this type is easiest to obtain and such a characteristic is desirable for obtaining a minimum of visible "noise" in transmission of the signal. Though the kinescopes do not amplify in the usual sense, it can be said that they have a variable mu or amplification depending upon the grid voltage. Since the three kinescopes of a tricolor system have various low-frequency grid voltages, they will reproduce the highs at various levels. Even if the characteristic were linear except for an abrupt cut-off, there would be serious infidelity of the high-frequency brightness response. For example, under conditions of no green light in the subject, the green kinescope would be at cut-off and hence could not properly reproduce the light values of the high frequency components which originated from abrupt variations in the red and blue picture areas.

However, according to this invention the low frequency signals for each color, combined with the mixed highs, are passed through a correcting non-linear circuit having curvature which is opposite to, or complementary to, the light response curvature of the kinescope. Thus the level at which the highs are applied to the correcting non-linear circuit is determined by the lows with which these highs are to be applied to the kinescope. In this way, when the highs are to be reproduced by a kinescope operating at low mu, the correcting non-linear circuit amplifying the highs and lows is operating at high mu and vice versa.

Figure 1:
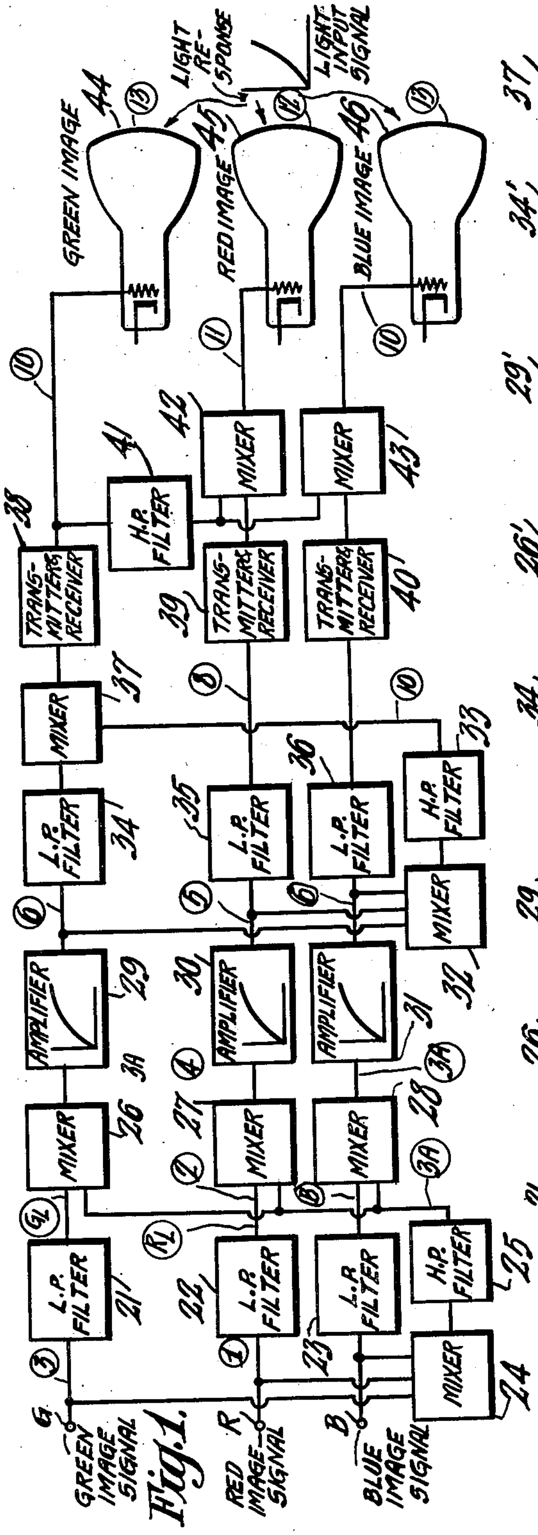
Figure 1 shows by block diagram one form of this invention.

Figure 1 shows apparatus for making the proposed modification of the transmitted signals to compensate for the non-linear light response of the kinescope. The numerals in circles correspond to the curve numbers of Figure 5 indicating wave form. Detailed explanation will follow in connection with Figure 5.

The low frequency components of the green, red, and blue signals from the "G," "R," and "B" terminals are separately selected by low-pass filters 21, 22, and 23.

Terminals G, R, and B of Figure 1 are adapted to receive tricolor signals from the color camera which may, for example, take the form of the color camera shown and described in the article entitled "Simultaneous all-electronic color television," beginning on page 459 of RCA Review for December, 1946.

The three original signals are added together by mixer 24 and the highs selected therefrom by high-pass filter 25 are recombined with the individual lows by mixers 26, 27, and 28. The outputs of these mixers are the same as those which would be applied to the kinescopes in the system employing mixed highs such as, for example, the type shown and described in my copending U. S. Patent No. 2,554,693 entitled "Simultaneous Multicolor Television" referred to above. Instead of applying these signals to image reproducing kinescopes, they are passed through three correcting non-linear amplifiers 29, 30, and 31 which have instantaneous amplitude curves complementary to the kinescope characteristics as illustrated graphically. It is, of course, desired that the D. C. component of the signals be present on these correcting amplifiers. D. C. setters are quite well known in the art and their description may be found in an article entitled "Television D. C. component," published in the RCA Review in March, 1948.

The outputs of the correcting amplifiers contain both lows and highs mixed together. These are not only the original lows and highs but some new ones generated by cross-modulation in the non-linear amplifiers. The outputs of amplifiers 29, 30, and 31 are added together in mixer 32. High-pass filter 33 passes only the high frequency components. The individual lows are then selected by low-pass filters 34, 35, and 36. The mixed highs obtained from mixer 32 and high-pass filter 33 are added to the green channel by mixer 37 and transmitted over the signal circuit by radio transmitter and receiver 38. The red lows and the blue lows are transmitted independently through transmitters and receivers 39 and 40 in a similar manner.

At the receiver the mixed highs are selected by the high-pass filter 41 and added to the red lows and blue lows in mixers 42 and 43 respectively. At the receiver the green lows together with the mixed highs are applied to the control electrode of the green image kinescope 44. The red lows are combined with the mixed highs in mixer 42 and applied to the control electrode of kinescope 45. The blue lows are combined with the mixed highs in mixer 43 and applied to the control electrode of kinescope 46.

Figure 3:
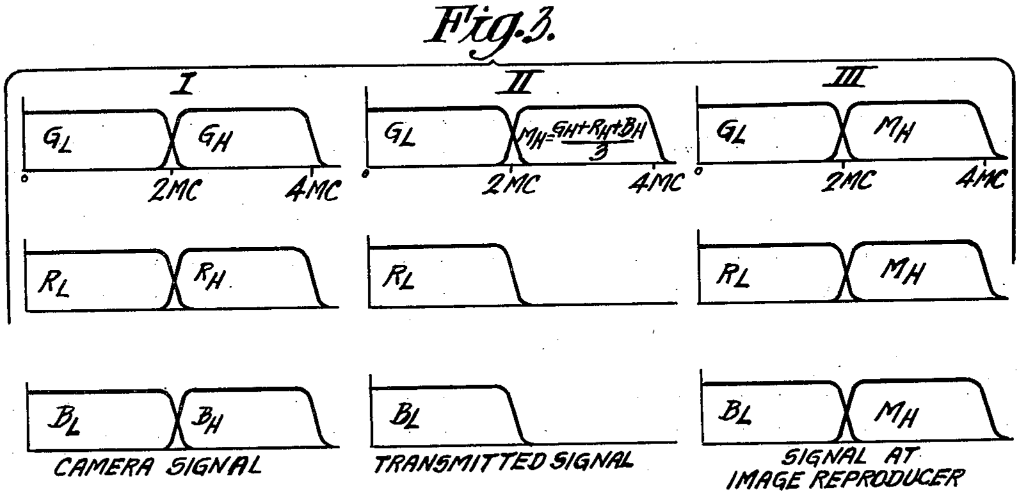
Figure 3 illustrates graphically the distribution of the signals in the operation of this invention; and, Figures 4 and 5 illustrate graphically the operation of this invention in its various forms.

The operation of this invention in its various forms may perhaps best be understood by a brief reference to graphical illustrations wherein the drawing of Figure 3 is intended to show the operation of the "mixed high" signal transmission arrangement proposed in my copending U. S. application entitled "Simultaneous Multicolor Television" referred to above.

In Figure 3 the various amplitude responses for the signals representing the different component colors of the image are shown as plotted against frequency or band width. On all of the curves and other portions of the drawing the letters "G," "R," and "B," respectively, indicate component colors green, red, and blue. Similarly, the sub-letters L and H represent, respectively, a low-frequency range and a high-frequency range of the signals. The letter M shown by these curves represents the additive mixture of signals representing such individual component colors as are actually present in the signal at any time Thus, it can be seen from a consideration of portion I of Figure 3 that the curve $G_L$ indicates the low-frequency response of an assumed green component color signal, and the curve $G_H$ correspondingly represents the high-frequency components of the same component color signal. Curves representing the red and blue components are likewise identified. In the portion II of Figure 3 there is represented again the low-frequency component responses for the green, red, and the blue component color signals. These various signals in a simultaneous system are all concomitantly transmitted to receiving and/or monitoring points.

In addition, however, in portion II of Figure 3 the curve designated $$M_H=\frac{G_H+R_H+B_H}{3}$$

represents the sum of all of the three tricolor signals of the green, red, and blue component colors in the high-frequency range with the amplitude of the signals in this range being reduced to an indicated value of one-third that which would normally be expected by adding together $G_H$, $R_H$, and $B_H$ of portion I of Figure 1. Thus, it becomes apparent from curve II of Figure 3 that the first channel, assumed herein to be the green, may be transmitted to include the low-frequency green component color signals and signals representing the summation or average value of all three of the tricolor signals in the higher frequency range. This signal transmission is then accompanied by signals representing the low frequency components of the red and the low frequency components of the blue component colors transmitted over separate signal channels either through the use of main carriers or sub-carriers. The actual transmission may, though not necessarily, follow methods already proposed in the above-mentioned application of Alfred C. Schroeder, Serial No. 706,613, or in the application of Gordon L. Fredendall, Serial No. 714,266, filed December 5, 1946, now Patent No. 2,513,159 granted June 27, 1950, and entitled "Color Television Transmitter."

Considering now the curve series III of Figure 3, it will be appreciated that if the transmission is of the character hereinabove described whereby the color sense is transmitted substantially in the low frequency range, and the detail or delineatory characteristics of the image are transmitted as a combination of the several signals or, in other words, as substantially a black and white monochrome signal which will be a measure of intensity and image brightness, although not its color (which color is derived from the transmitted low frequencies), it will be appreciated that the reproduced image as finally viewed and produced for each component color representation should include not only the component color but, also, the detail included in the image. Accordingly, the signals received at the receiver 38 are applied both to kinescope 44 and to a suitable high-pass filter 41. The signals received at the receivers 39 and 40 are applied directly therefrom to the mixer units 42 and 43. Along with these signals in the mixer units 42 and 43, as the case may be, there is applied to the input of the mixers 42 and 43, the output signals from the high-pass filter unit 41. The output from the mixers 42 and 43 is then passed to kinescopes 45 and 46.

The high-pass filter 41 is of generally similar character to the high-pass filters 25 or 33 described in connection with the transmitter end of the system and its function is to cut off all frequencies which have been illustrated and explained hereinabove as being in the so-called low frequency or color establishing range but the filter 41 is designed to transmit those signals which are indicated as being in the so-called high frequency or intensity or brightness indicating range. In this sense, the output of the filter 41, having supplied to its input the signals indicated on portion II of Figure 3 as the wave form $G_L$ and $M_H$, will include only the portion of the input which is represented beneath the curve $M_H$. These signals shown as $M_H$ represent now the high frequency components of the scanned image at the transmitter point and, as explained, include the high frequency components representative of the composite of the red, the green, and the blue. Thus, the output of the high-pass filter 41 is applied to the mixer unit 42 input along with the low frequency components of the "red" signal. This may be accomplished by applying the signal at the receiver 39 to the input electrode of an amplifier tube whose plate is connected in parallel with a second amplifier tube to whose input circuit the output from the high-pass filter 41 is applied. These tubes may or may not provide any amplification, depending upon whether or not any amplifying stages are included in the connection channel between the receiver 38 and the kinescope 44 for the assumed green signal.

Similarly, the output of the high-pass filter 41, including the high frequency components, is combined with the low frequency components of the assumed "blue" signal received at the input of the mixer 43. The mixer unit 43 is of generally similar character to that explained with respect to the mixer 42. The output signal from the mixer 43 becomes available at kinescope 46.

The drawing diagrammatically sets forth the invention for the purposes of simplifying the explanation, the signal is used to modulate and control an image reproducing tube, or tubes such as separate kinescopes 44, 45, and 46 for instance, to bring about the image reproduction in appropriate color of the image scanned at the transmitter. Various ways of combining the separate images for observation are known and have already been explained in the art so that further illustration of such a method herein is deemed unnecessary, although, if desired, reference may again be made to the disclosure of an illustrative method which was explained in the already mentioned publication, "Electronic Industries." In any event, if the signals are brought to three separate image producing kinescopes each producing an image for viewing in one component color and these separate images are then registered on a separate observation screen, it will be apparent that an additive tricolor image appears in the plane of image registry where all of the various images are brought into viewing position.

The invention hereinabove explained sets forth the general principal of transmitting the various signals indicating color representations as low frequency modulations and the combination signal as the high frequency modulations which provides the image detail and intensity. However, various other methods whereby these general results may be accomplished are possible. One such modification provides that the green component color signal shall occupy a greater band width than does the assumed red and blue component color signal. The composite signal will occupy substantially half the total band width required for such separate color transmission and, likewise, in the spectrum intervening between the low frequency representation of the assumed red and blue component color signals and the mixture signal, there is provided a further signal representing only the mixture of the red low frequency components and the blue low frequency components. In connection with the mixture signals, it is, of course, to be appreciated that the actual amplitude of the signals represented is of the order of one-third that normally resulting from the combination of equal brilliance signals in all separate component colors and in connection with the combination of the two signals for red and blue, the signal is similarly reduced.

By such modification as suggested immediately above, some further transmitter modifications will naturally be required but it is believed that it will be completely clear in the light of what has been stated above as to how this may be brought about. Suffice it to say, for the moment, that such latter arrangement favors the green signal by providing a wider low-pass band than for the red and the blue, due to the fact that the eye has greatest acuity for green, as was explained in the mentioned Schroeder application referred to above.

Figure 4:
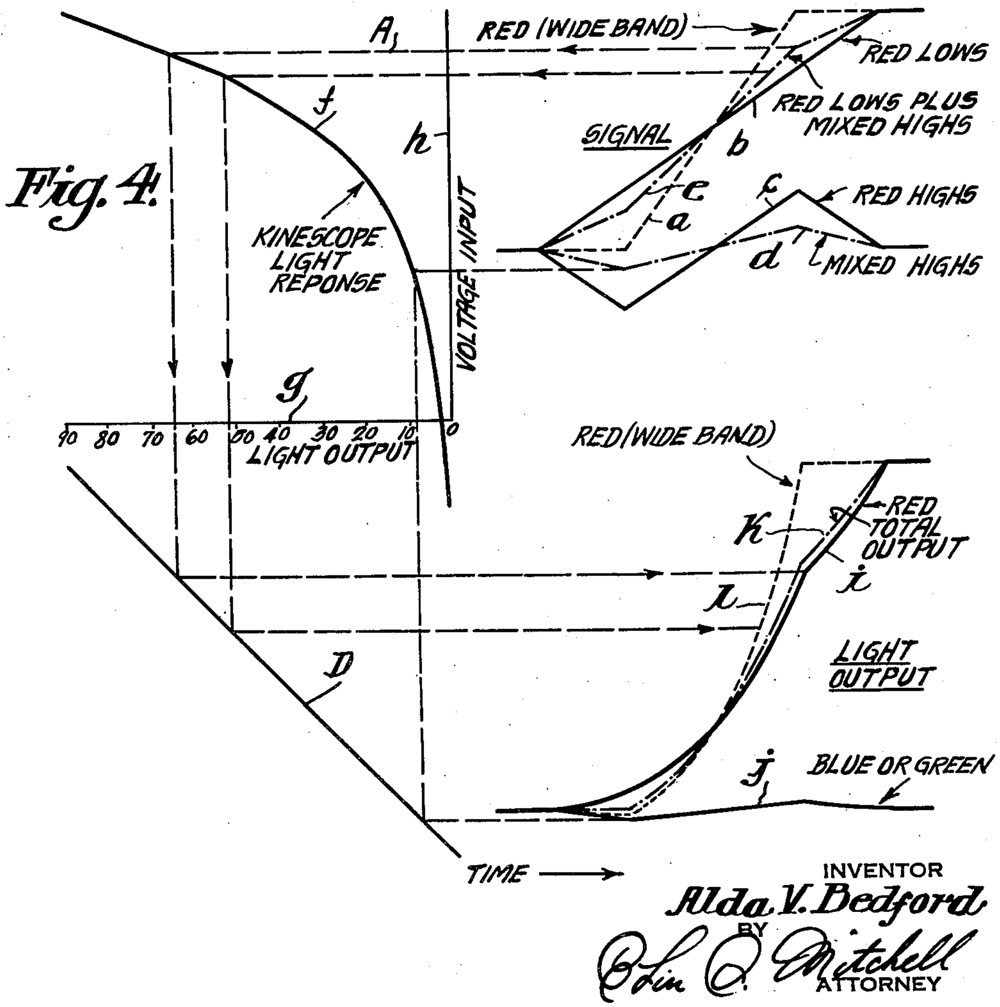

The curves of Figure 4 illustrate graphically the improvement which the practice of this invention adds to the system. Curve *a* is used here to represent roughly the transient response of the red channel for an abrupt change from black to red in the scene. The steepness of rise arbitrarily corresponds to a uniform 4-megacycle bandwidth. In my copending application referred to above it was explained that the square wave response for a flat amplifier with abrupt cut-off is a curve having overswing and several increasing and decreasing oscillations before and after the main rise. The use of the straight-line curve is acceptable for illustrative purposes. Curve *b*, which requires twice as long to rise as curve *a*, represents the response when the channel is limited to 2 mc., and in this case is the transient response produced by the lows of the red channel. Curve *c*, which is the difference between curves *a* and *b*, is the highs of that channel, from 2 to 4 mc. Since the green and blue light of this part of the screen is zero, curve *c* is also the total highs. One-third of curve *c*, which is curve *d*, is then the mixed highs. This is to be added to the lows of each color channel for application to the kinescope. For the red channel the kinescope voltage then is curve *e*, which is the sum of curves *b* and *d*. Curve *d* is the total signal applied to the green and the blue kinescopes because the lows are zero for these colors. The kinescope ideal characteristic is shown by curve *f* in which light output increases along the ordinate scale *g* in accordance with voltage increase along abscissa scale *h*. The voltage varies as the logarithm of the light output as indirectly standardized for black and white television by transmitter specifications. By a well-known geometric construction method illustrated by lines A, B, and C, and D, curve *i* has been drawn to represent the light output of the red kinescope. Similarly, curve *j* represents the light output for the green and for the blue kinescopes. The total light output then is curve *k* which is the sum of curve *i* and twice curve *j*. Curve *l* is the light output which would have been provided by the red kinescope if the full 4-mc. red channel had been transmitted. Obviously this curve *k* provided by the mixed highs system has much less steepness so that proper resolution is not obtained in this case. Inspection shows that the positive lobe of curve *j* was inadequate. This inadequacy results from the fact that the highs were reproduced by kinescopes operating near cut-off where they have very low light sensitivity or mu. As curve *k* shows, this was adequate for the start of the rise where the red tube also operated at low mu, but it was inadequate near the finish of the rise where the red tube (which reproduced the lows) was operating at high mu.

It is obvious that an arbitrary increase of the gain of the high frequency channel would not be a proper correction because it would make the first lobe of curve *j* too great. Also it would be incorrect for those cases where all three colors vary together, that is, in white and grey areas.

Also, it can be shown that the preliminary treatment of curve *a*, to compensate for the curvature of the kinescope, would not be satisfactory.

Figure 5:
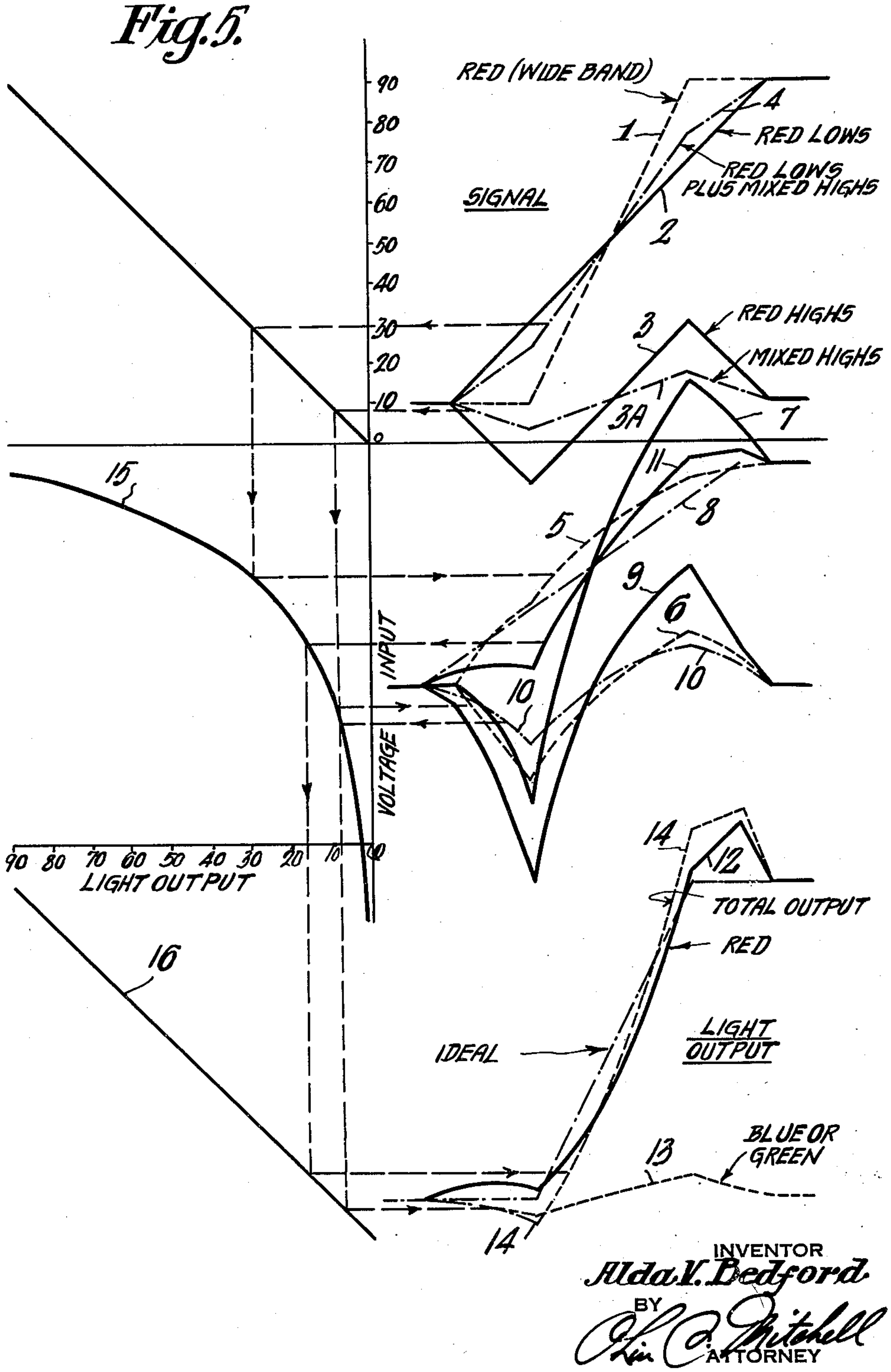

The curves of Figure 5 illustrate graphically the improvement in response obtained by employing the arrangements taught by this invention. The numbers in circles in the circuit refer to the curves in Figure 5. Curve 1 is the complete red signal from 0 to 4 mc. Curve 2 is the red lows from 0 to 4 mc., so that the difference curve 3 is the red highs (from 2 to 4 mc.), and for this example is the mixed highs. The mixed highs for each channel is one-third of curve 3, which is curve 3A. This is the input to correcting amplifiers 29 and 31 of the circuit diagram. Adding curve 3A to curve 2 gives the curve 4 which is the input to the correcting non-linear amplifier 30 on the block diagram. The curve 15 is the kinescope characteristic the same as curve *f* of Figure 4. The curves 5 and 6 were obtained from curves 4 and 3A, respectively, by using a geometric construction to give the complementary of the kinescope characteristic. They show the effect of the correcting non-linear amplifiers. To get the complementary characteristic of curve 15 the input is assumed to be applied to the "light output" scale and the output is obtained from the scale marked "voltage input."

The total of the signal outputs of the correcting amplifiers is shown by curve 7. Curve 8 is drawn by inspection to represent the lows of curve 7. Then the difference curve 9 is the total mixed highs. The mixed highs for each channel is one-third of curve 9, which is curve 10. In the receiver these highs are added to the blue lows (curve 8) making curve 11. The kinescope characteristic is used again (with the input applied to the voltage scale) to construct curve 12 which is the light output of the red kinescope. Similarly, the wave of curve 10 is treated to give curve 13 which is the light output of each of the other kinescopes. The total light output is curve 12 plus twice curve 13, which is curve 14.

Inspection of curve 14 shows that it rises as quickly as curve 1 which corresponds to full 4 mc. filedity and resolution. Curve 14 has considerable overswing and curvature not present in ideal curve 1. This is partly due to the approximations in the method of deriving the curves and is partly caused by limitations of the circuit of Figure 1, explained above.

It is true that the sum of wave 11 and twice wave 10 is equal to the sum of wave 5 and twice wave 6. Thus the total signal impressed upon the kinescope is the same as the total signal obtained from the correcting non-linear amplifier. This is a desirable condition for obtaining the required correction for the curved kinescope, but it is not sufficient because wave 11 differs from wave 5 and wave 10 differs from wave 6. This means that certain components of the signal are at the wrong voltage level when passing through the correcting non-linear circuit so that the effect upon the signal is not entirely complementary even though the curves are complementary.

To be more specific, curve 11 is higher than curve 5 in the region near the finish of the rise. Thus when this part of wave 11 is reproduced by the kinescope, it becomes more expanded than the corresponding part of wave 4 (which becomes wave 11) was compressed in passing through the correcting non-linear amplifier.

The following chart is included to permit quick and convenient reference to the curves of Figure 5:

#1 Red signal (0 to 4 mc.)
#2 Red lows, $R_L$ (0 to 2 mc.)
#3 Red highs, $R_H$ (2 to 4 mc.)
#3A $M_{H/3}$
#4 $R_L+M_{H/3}$
#5 Signal #4 with highlights compressed
#6 Signal #3A with highlights compressed
#7 Signal #5+(2×#6)
#8 Lows of #7, by inspection
#9 Highs of #7, #7−#8
#10 ⅓ of #9
#11 #8+#9
#12 #11 with highlights expanded
#13 #10 with highlights expanded
#14 #12+(2×#13)
#15 The kinescope characteristic and its complementary amplifier characteristics.

Figure 2:
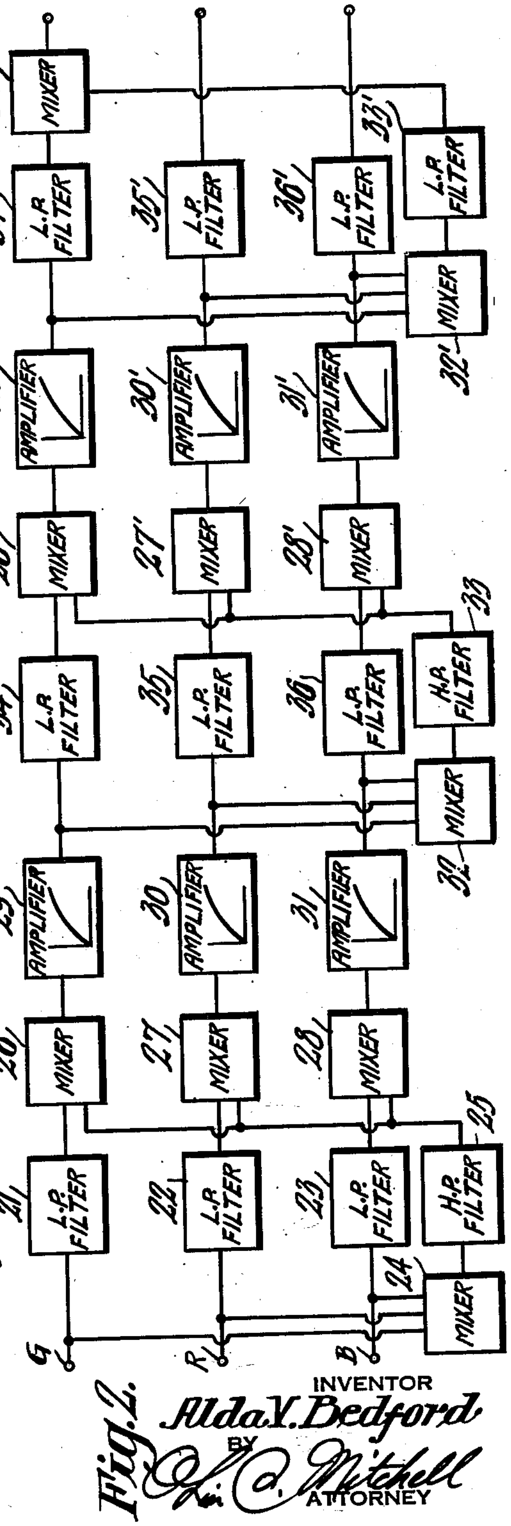
Figure 2 shows by block diagram another form of this invention.

Turning now to Figure 2 of the drawing there is shown another form of this invention.

Though the circuit of Figure 1 is generally acceptable, the embodiment of Figure 2 may be used to give more accurate results. In the form of this invention shown in Figure 2, the non-linear amplitude correction is obtained in two steps instead of one step as in the circuit shown in Figure 1. The circuit elements 21 to 37 are the same as the correspondingly numbered elements in the circuit shown in Figure 1, except that the correcting non-linear amplifiers 29, 30, and 31 are less curved in response, and supply only a portion, say for example one-half, of the needed correction. The circuit elements 21′ to 36′ are the same as correspondingly numbered elements 21 to 36. In Figure 2 the signal transmission circuit indicated by blocks 38, 39, and 40 in Figure 1 are not shown but they may of course take the same form. The transmitter receivers 38, 39, and 40 would be in Figure 2 be connected respectively to mixer 37, low-pass filter 35′ and low-pass filter 36′.

The advantage of making the correction in two or more steps arises because of the fact that the signals applied to all correcting non-linear amplifiers after the first one are more nearly like the final signals applied to the kinescope than are the signals applied to the first correcting amplifier. Therefore the compressing effect of the subsequent correcting amplifier is more nearly complementary to the expanding effect of the kinescope.

Recent tests have indicated that the acuity of the eye for blue light is so low in comparison with that for red or green light, that the blue picture component does not need any response above 1 or 1.5 mc. Therefore it may be better to mix only the red and green highs from, say, 2 to 4 mc., and to cut off the blue channel at, say, 1.5 mc. The total video bandwidth then would be 4+2+1.5=7.5 mc. This is much less than the 12 mc. which would be required for three full 4 mc. bands which was once considered necessary to get a color picture with resolution equal to a 4 mc. black and white picture.

The invention hereinbefore described has been set forth particularly with relationship to a tricolor transmission. It is, however, to be understood that the same general principles may be carried out in connection with the bi-color transmission method where adequate color rendition can be had by bicolor methods. Also, it is to be understood that, where desired and under some conditions of operation, recourse may be had to separate image analyzing elements for producing the component color signals and still a further synchronously operating scanning instrumentality also functioning in like phase relationship to the color analyzers may be relied upon for producing substantially a black and white monochrome signal output representative of the scanned image subject. Under such circumstances, the low frequency components of the produced black and white signal will be separated from the high frequency components and the high frequency components that are left will be transmitted as the intensity control signal herein identified as occupying the spectrum portion marked $M_H$, as in Figure 3. Likewise the high frequency components resulting from the separate color analysis will be attenuated and the low frequency components corresponding to those designated in Figure 3 by the letters $G_L$, $R_L$, $B_L$ will be attenuated so that the low frequency components only need be transmitted from the separate component color analyzers.

Having thus described the invention what is claimed is:

1. In a color television transmitting system having independent selected component color image signal channels and being of the type involving the transmission of the low frequency components of a plurality of individual image signals each representative of the image in one of a plurality of selected component colors and a mixture of the high frequency components of a plurality of individual image signals each representative of said image in one of a plurality of selected component colors the combination of means for adding said mixture of said high frequency component signals to each of said plurality of individual image signals, a non-linear amplifier connected in each of said channels to receive the combined low frequency components and high frequency components and means connected to each of said amplifiers for transmitting only the low frequency components of the modified signals together with a mixture of the high frequency components.

2. In a color television transmitting system having independent selected component color image signal channels and being of the type involving the transmission of the low frequency components of a plurality of individual image signals each representative of the image in one of a plurality of selected component colors and a mixture of the high frequency components of a plurality of individual image signals each representative of said image in one of a plurality of selected component colors the combination of means for adding said mixture of said high frequency component signals to said individual image signals, and a non-linear amplifier connected in one of said channels to receive the combined low frequency components and high frequency components.

3. In a color television transmitting system having independent selected component color image signal channels and being of the type involving the transmission of the low frequency components of a plurality of individual image signals each representative of the image in one of a plurality of selected component colors and a mixture of the high frequency components of a plurality of individual image signals each representative of said image in one of a plurality of selected component colors the combination of a mixer circuit connected to each of said channels for adding said mixture of said high frequency component signals to said individual image signals, a non-linear amplifier connected in one of said channels after the point to which said mixers are connected to receive the combined low frequency components and high frequency components and means connected to each of said amplifiers for transmitting only the low frequency components of the modified signals together with a mixture of the high frequency components.

4. In a color television apparatus for signal pick-up and transmission comprising, a source of a set of individual image signals each representative of a scanned object in one of a plurality of selected component colors, first signal deriving means coupled to said signal source to derive from said set of individual image signals a first set of signal tranis occupying a relatively narrow frequency band including low frequency components, first signal combining means coupled to said signal source to combine at least two of said individual image signals to form a first series of mixed signals occupying a predetermined relatively narrow frequency band including high frequency components, first signal adding means coupled to said first signal combining means and to each of said first signal deriving means to form a second set of signal trains, means coupled to said first signal adding means to modify the amplitude characteristic of each of said second set of signal trains to form a third set of signal trains, second signal deriving means coupled to said signal amplitude modifying means to derive from said third set of signal trains a fourth set of signal trains occupying a relatively narrow frequency band including low frequency components, second signal combining means coupled to said signal amplitude modifying means to combine at least two signal trains of said third set of signal trains to form a second series of mixed signals occupying a predetermined relatively narrow frequency band including high frequency components, second signal adding means coupled to said second signal combining means and to one of said second signal deriving means to add said second series of mixed signals to one signal train of said fourth set of signal trains, and means coupled to said second signal adding means to transmit the signal trains of said fourth set of signal trains with said second series of mixed signals added to one of said fourth set of signal trains.

5. In color television apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine at least two of said individual image signals to form a first series of mixed signals occupying a predetermined relatively narrow frequency band including high frequency components, first signal adding means coupled to said first signal combining means and to each of said first signal deriving means to form a second set of signal trains, means coupled to said first signal adding means to modify the amplitude characteristic of each of said second set of signal trains to form a third set of signal trains, second signal deriving means coupled to said amplitude modifying means to derive from said third set of signal trains a fourth set of signal trains occupying a relatively narrow frequency band including low frequency components, second signal combining means coupled to said amplitude modifying means to combine at least two signal trains of said third set of signal trains to form a second series of mixed signals occupying a predetermined relatively narrow frequency band including high frequency components, and means coupled to said second signal deriving means and to said second signal combining means to transmit the signal trains of said fourth set of signal trains and said second series of mixed signals.

6. In a color television system of the type employing an image reproducing tube having a predetermined light response characteristic other than linear, apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine at least two of said individual image signals to form a first series of mixed signals occupying a predetermined relatively narrow frequency band including high frequency components, first signal adding means coupled to said first signal combining means and to each of said first signal deriving means to form a second set of signal trains, means coupled to said first signal adding means to modify the amplitude characteristic of each of said second set of signal trains to form a third set of signal trains, second signal deriving means coupled to said signal amplitude modifying means to derive from said third set of signal trains a fourth set of signal trains occupying a relatively narrow frequency band including low frequency components, second signal combining means coupled to said signal amplitude modifying means to combine at least two signal trains of said third set of signal trains to form a second series of mixed signals occupying a predetermined relatively narrow frequency band including high frequency components, and second signal adding means coupled to said second signal combining means and to one of said second signal deriving means to add said second series of mixed signals to one signal train of said fourth set of signal trains.

7. In a color television system of the type employing an image reproducing tube having a predetermined light response characteristic other than linear, apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine at least two of said individual image signals to form a first series of mixed signals occupying a predetermined relatively narrow frequency band including high frequency components, first signal adding means coupled to said first signal combining means and to each of said first signal deriving means to form a second set of signal trains, means coupled to said first signal adding means to modify the amplitude characteristic of each of said second set of signal trains to form a third set of signal trains, second signal deriving means coupled to said signal amplitude modifying means to derive from said third set of signal trains a fourth set of signal trains occupying a relatively narrow frequency band including low frequency components, and second signal combining means coupled to said signal amplitude modifying means to combine at least two signal trains of said third set of signal trains to form a second series of mixed signals occupying a predetermined relatively narrow frequency band including high frequency components.

8. In a color television system of the type employing an image reproducing tube having a predetermined light response characteristic other than linear, apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine all of said individual image signals to form a first series of mixed signals occupying a predetermined relatively narrow frequency band including high frequency components, first signal adding means coupled to said first signal combining means and to each of said first signal deriving means to form a second set of said first signal deriving means to form a second set of signal trains, means coupled to said first signal adding means to modify the amplitude characteristic of each of said second set of signal trains to form a third set of signal trains, second signal deriving means coupled to said signal amplitude modifying means to derive from said third set of signal trains a fourth set of signal trains occupying a relatively narrow frequency band including low frequency components, second signal combining means coupled to said signal amplitude modifying means to combine a plurality of said third set of signal trains to form a second series of mixed signals occupying a predetermined relatively narrow frequency band including high frequency components, second signal adding means coupled to said second signal combining means and to one of said second low frequency signal deriving means to add said second series of mixed signals to one signal train of said fourth set of signal trains, and means coupled to said second signal adding means to transmit the signal trains of said fourth set of signal trains with said second series of mixed signals added to one of said fourth set of signal trains.

9. In a color television system of the type employing an image reproducing tube having a predetermined light response characteristic other than linear, apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine at least two of said individual image signals to form a first series of mixed signals occupying a predetermined relatively narrow frequency band including high frequency components, first signal adding means coupled to said first signal combining means and to each of said first signal deriving means to form a second set of signal trains, means coupled to said first signal adding means to modify the amplitude characteristic of each of said second set of signal trains substantially in accordance with the reciprocal of the light response characteristic of said image reproducing tube to form a third set of signal trains, second signal deriving means coupled to said signal amplitude modifying means to derive from said third set of signal trains a fourth set of signal trains occupying a relatively narrow frequency band including low frequency components, second signal combining means coupled to said signal amplitude modifying means to combine at least two signal trains of said third set of signal trains to form a second series of mixed signals occupying a predetermined relatively narrow frequency band including high frequency components, second signal adding means coupled to said second signal combining means and to one of said second low frequency signal deriving means to add said second series of mixed signals to one signal train of said fourth set of signal trains, and means coupled to said second signal adding means to transmit the signal trains of said fourth set of signal trains with said second series of mixed signal added to one of said fourth set of signal trains.

10. In a color television system of the type employing an image reproducing tube having a predetermined light response characteristic other than linear, apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine at least two of said individual image signals to form a first series of mixed signals occupying a predetermined relatively narrow frequency band including high frequency components, first signal adding means coupled to said first signal combining means and to each of said first signal deriving means to form a second set of signal trains, means coupled to said first signal adding means to modify the amplitude characteristic of each of said second set of signal trains substantially in accordance with the reciprocal of the light response characteristic of said image reproducing tube to form a third set of signal trains, and second signal deriving means coupled to said signal amplitude modifying means to derive from said third set of signal trains a fourth set of signal trains occupying a relatively narrow frequency band including low frequency components.

11. In a color television system of the type employing the transmission of the low frequency components of a plurality of individual image signals each representative of an object in one of a plurality of selected component colors and a mixture of the high frequency components of a plurality of individual image signals each representative of said object in one of a plurality of selected component colors, signal transmitting apparatus comprising, a source of a set of individual image signals each representative of a scanned object in one of a plurality of selected component colors, means coupled to said signal source to add a mixture of the high frequency components of said plurality of individual image signals to each of said plurality of individual image signals, means coupled to said signal adding means to modify the amplitude characteristics of each of the combined signals, and means coupled to said amplitude modifying means to transmit only the low frequency components of said modified signals together with a mixture of said high frequency components.

12. In a color television apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine at least two of said individual image signals to form a first series of mixed signals occupying a predetermined relatively narrow frequency band including high frequency components, first signal adding means coupled to said first signal combining means and to each of said first signal deriving means to form a second set of signal trains, first signal amplitude modifying means coupled to said first signal adding means to modify the amplitude characteristic of each of said second set of signal trains to form a third set of signal trains, second signal deriving means coupled to said first signal amplitude modifying means to derive from said third set of signal trains a fourth set of signal trains occupying a relatively narrow frequency band including low frequency components, second signal combining means coupled to said first signal amplitude modifying means to combine at least two signal trains of said third set of signal trains to form a second series of mixed signals occupying a predetermined relatively narrow frequency band including high frequency components, second signal adding means coupled to said second signal combining means to add said second series of mixed signals to each of said fourth set of signal trains to form a fifth set of signal trains, second signal amplitude modifying means coupled to said third signal adding means to modify the amplitude characteristic of each of said fifth set of signal trains to form a sixth set of signal trains, third signal deriving means coupled to said second signal amplitude modifying means to derive from said sixth set of signal trains a seventh set of signal trains occupying a relatively narrow frequency band including low frequency components, third signal combining means coupled to said second signal amplitude modifying means to combine at least two signal trains of said sixth set of signal trains to form a third series of mixed signals occupying a predetermined relatively narrow frequency band including high frequency components, and third signal adding means coupled to said third signal combining means and to one of said third signal deriving means to add said third series of mixed signals to one of said seventh set of signal trains to form an eighth set of second trains.

13. In a color television apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine at least two of said individual image signals to form a first series of mixed signals occupying a predetermined relatively narrow frequency band including high frequency components, first signal adding means coupled to said first signal combining means and to each of said first signal deriving means to form a second set of signal trains, first signal amplitude modifying means coupled to said first signal adding means to modify the amplitude characteristic of each of said second set of signal trains to form a third set of signal trains, second signal deriving means coupled to said first signal amplitude modifying means to derive from said third set of signal trains a fourth set of signal trains occupying a relatively narrow frequency band including low frequency components, second signal combining means coupled to said first signal amplitude modifying means to combine at least two signal trains of said third set of signal trains to form a second series of mixed signals occupying a predetermined relatively narrow frequency band including high frequency components, second signal adding means coupled to said second signal combining means to add said second series of mixed signals to each of said fourth set of signal trains to form a fifth set of signal trains, second signal amplitude modifying means coupled to said third signal adding means to modify the amplitude characteristic of each of said fifth set of signal trains to form a sixth set of signal trains, third signal deriving means coupled to said second signal amplitude modifying means to derive from said sixth set of signal trains a seventh set of signal trains occupying a relatively narrow frequency band including low frequency components, and third signal combining means coupled to said second signal amplitude modifying means to combine at least two signal trains of said sixth set of signal trains to form a third series of mixed signals occupying a predetermined relatively narrow frequency band including high frequency components.

14. In a color television apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine at least two of said individual image signals to form a first series of mixed signals occupying a predetermined relatively narrow frequency band including high frequency components, first signal adding means coupled to said first signal deriving means to form a second set of signal trains, first signal amplitude modifying means coupled to said first signal adding means to modify the amplitude characteristic of each of said second set of signal trains to form a third set of signal trains, second signal deriving means coupled to said first signal amplitude modifying means to derive from said third set of signal trains a fourth set of signal trains occupying a relatively narrow frequency band including low frequency components, second signal combining means coupled to said first signal amplitude modifying means to combine at least two signal trains of said third set of signal trains to form a second series of mixed signals occupying a predetermined relatively narrow frequency band including high frequency components, second signal adding means coupled to said second signal combining means to add said second series of mixed signals to each of said fourth set of signal trains to form a fifth set of signal trains, second signal amplitude modifying means coupled to said third signal adding means to modify the amplitude characteristic of each of said fifth set of signal trains to form a sixth set of signal trains, third signal deriving means coupled to said second signal amplitude modifying means to derive from said sixth set of signal trains a seventh set of signal trains occupying a relatively narrow frequency band including low frequency components, third signal combining means coupled to said second signal amplitude modifying means to combine at least two signal trains of said sixth set of signal trains to form a third series of mixed signals occupying a predetermined relatively narrow frequency band including high frequency components, third signal adding means coupled to said third signal combining means and to one of said third signal deriving means to add said third series of mixed signals to one of said seventh set of signal trains to form an eighth set of second trains, and means coupled to said third signal adding means to transmit the signal trains of said seventh set of signal trains with said third series of mixed signals added to one of said seventh set of signal trains.

15. In a color television system of the type employing an image reproducing tube having a predetermined light response characteristic other than linear, apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine all of said individual image signals to form a first series of mixed signals occupying a predetermined relatively narrow frequency band including high frequency components, first signal adding means coupled to said first signal combining means and to each of said first signal deriving means to form a second set of signal trains, first signal amplitude modifying means coupled to said first signal adding means to modify the amplitude characteristic of each of said second set of signal trains substantially in accordance with the reciprocal of the light response characteristic of said image reproducing tube to form a third set of signal trains, second signal deriving means coupled to said first signal amplitude modifying means to derive from said third set of signal trains a fourth set of signal trains occupying a relatively narrow frequency band including low frequency components, second signal combining means coupled to said first signal amplitude modifying means to combine a plurality of the signal trains of said third set of signal trains to form a second series of mixed signals occupying a predetermined relatively narrow frequency band including high frequency components, second signal adding means coupled to said second signal combining means to add said second series of mixed signals to each of said fourth set of signal trains to form a fifth set of signal trains, second signal amplitude modifying means coupled to said third signal adding means to modify the amplitude characteristic of each of said fifth set of signal trains substantially in accordance with the reciprocal of the light response characteristic of said image reproducing tube to form a sixth set of signal trains, third signal deriving means coupled to said second signal amplitude modifying means to derive from said sixth set of signal trains a seventh set of signal trains occupying a relatively narrow frequency band including low frequency components, and third signal combining means coupled to said second signal amplitude modifying means to combine two signal trains of said sixth set of signal trains to form a third series of mixed signals occupying a predetermined relatively narrow frequency band including high frequency components.

16. In a color television apparatus for signal pick-up and transmission comprising, a source of a set of individual image signals each representative of a scanned object in one of a plurality of selected component colors, first signal deriving means coupled to said signal source to derive from said set of individual image signals a first set of signal trains occupying a relatively narrow frequency band including low frequency components, first signal combining means coupled to said signal source to combine all of said individual image signals to form a first series of mixed signals occupying a predetermined relatively narrow frequency band including high frequency components, first signal adding means coupled to said first signal combining means and to each of said first signal deriving means to form a second set of signal trains, means coupled to said first signal adding means to modify the amplitude characteristic of each of said second set of signal trains to form a third set of signal trains, second signal deriving means coupled to said signal amplitude modifying means to derive from said third set of signal trains a fourth set of signal trains occupying a relatively narrow frequency band including low frequency components, second signal combining means coupled to said signal amplitude modifying means to combine two signal trains of said third set of signal trains to form a second series of mixed signals occupying a predetermined relatively narrow frequency band including high frequency components, second signal adding means coupled to said second signal combining means and to one of said second signal deriving means to add said second series of mixed signals to one signal train of said fourth set of signal trains, and means coupled to said second signal adding means to transmit the signal trains of said fourth set of signal trains with said second series of mixed signals added to one of said fourth set of signal trains.

ALDA V. BEDFORD.

REFERENCES CITED

The following references are of record in the file of this patent:

UNITED STATES PATENTS

| Number | Name | Date |
|---|---|---|
| 2,335,180 | Goldsmith | Nov. 23, 1943 |
| 2,359,637 | Goldsmith | Oct. 3, 1944 |